United States Patent [19]

Kozar

[11] Patent Number: 4,549,727

[45] Date of Patent: Oct. 29, 1985

[54] LAZY SUSAN VISE

[76] Inventor: John J. Kozar, 800 Carl Ave., New Kensington, Pa. 15068

[21] Appl. No.: 536,190

[22] Filed: Sep. 26, 1983

[51] Int. Cl.⁴ ............................................. B23Q 1/04
[52] U.S. Cl. ....................................... 269/70; 269/93; 269/287; 248/310
[58] Field of Search ...................... 269/69, 70, 91, 93, 269/99–100, 900, 247, 251, 76, 287; 248/222.2, 310, 187, 154, 244, 670, 172; 211/43; 308/3 A

[56] References Cited

U.S. PATENT DOCUMENTS

| | | | |
|---|---|---|---|
| 1,026,475 | 5/1912 | Tarbuck | 269/100 |
| 1,367,579 | 2/1921 | Ziegler et al. | 269/69 |
| 2,429,617 | 10/1947 | Gustafson | 269/70 |
| 2,495,438 | 1/1950 | Bentley et al. | 269/70 |
| 3,806,108 | 4/1974 | Adachi et al. | 269/287 |
| 4,058,302 | 11/1977 | Barrowcliff | 269/76 |
| 4,155,542 | 5/1979 | Jansson | 269/94 |
| 4,211,379 | 7/1980 | Morgan et al. | 248/222.2 |
| 4,400,969 | 8/1983 | Specktor | 269/900 |

*Primary Examiner*—Robert C. Watson
*Attorney, Agent, or Firm*—Harvey B. Jacobson

[57] ABSTRACT

A rotary vise structure comprises a worktable journally mounted for rotation in a base member which includes a releasable latching rod adapted to engage selected openings in the worktable to hold the worktable in selected angular positions. The latching rod may be released to allow the worktable to be indexed to alternative angular positions, and the latching rod may also be held by a retainer in the released position to allow free rotation of the worktable. The worktable includes adjustable jaws for clamping articles thereon, the jaws being received in slideways of inverted-T profile. The worktable is made up of a plurality of plates secured face to face, the plates being appropriately slotted to define the inverted-T shaped slideways.

7 Claims, 6 Drawing Figures

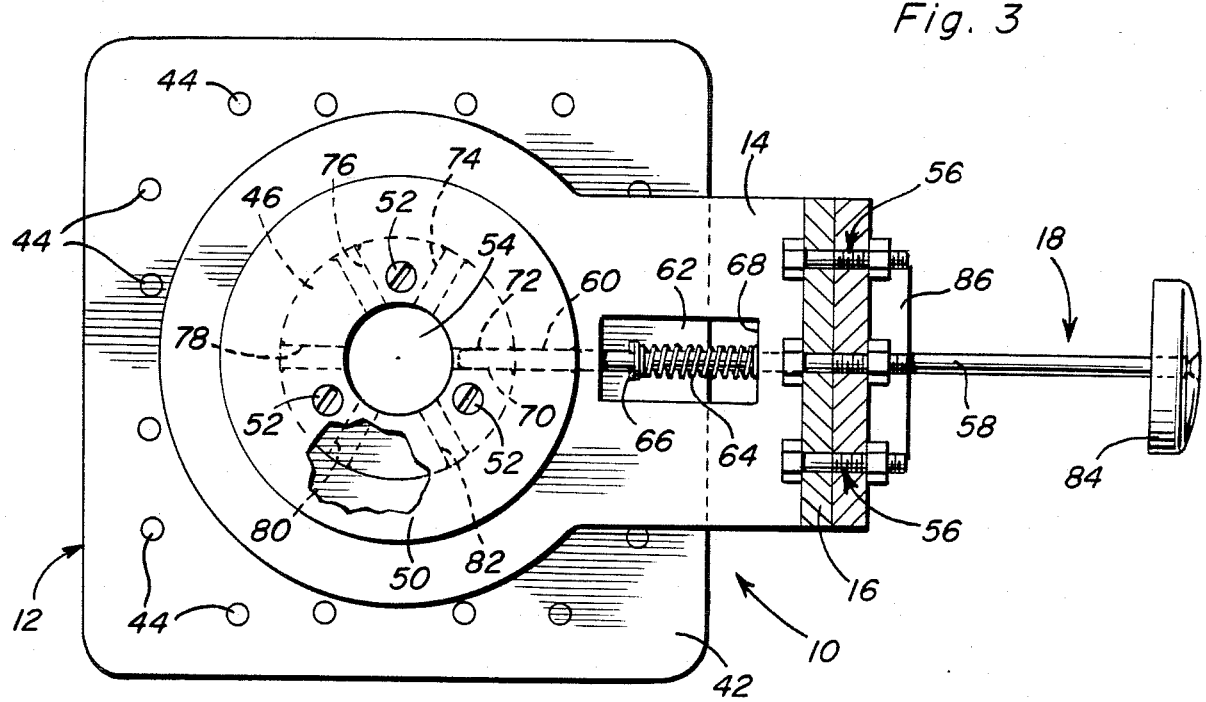
Fig. 3
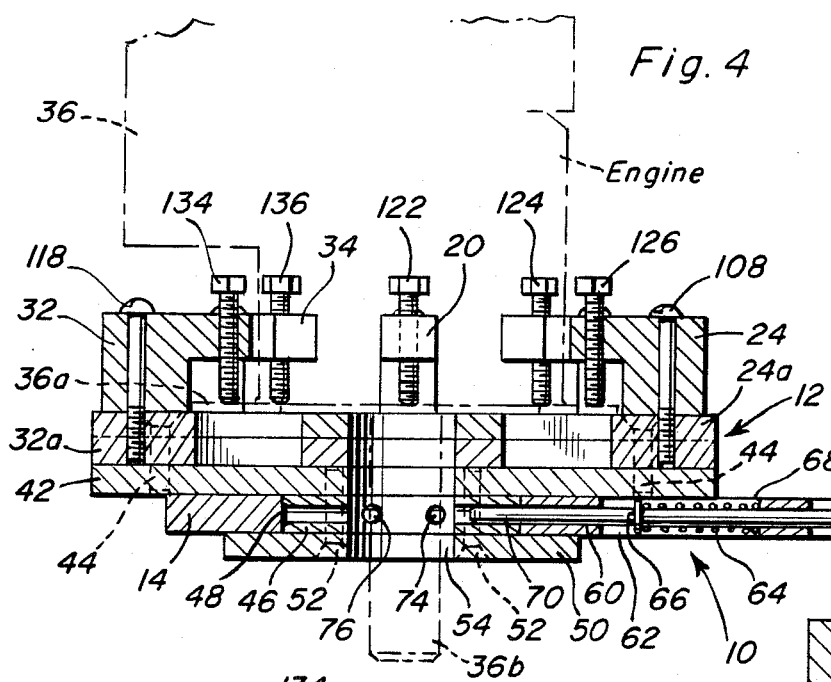
Fig. 4
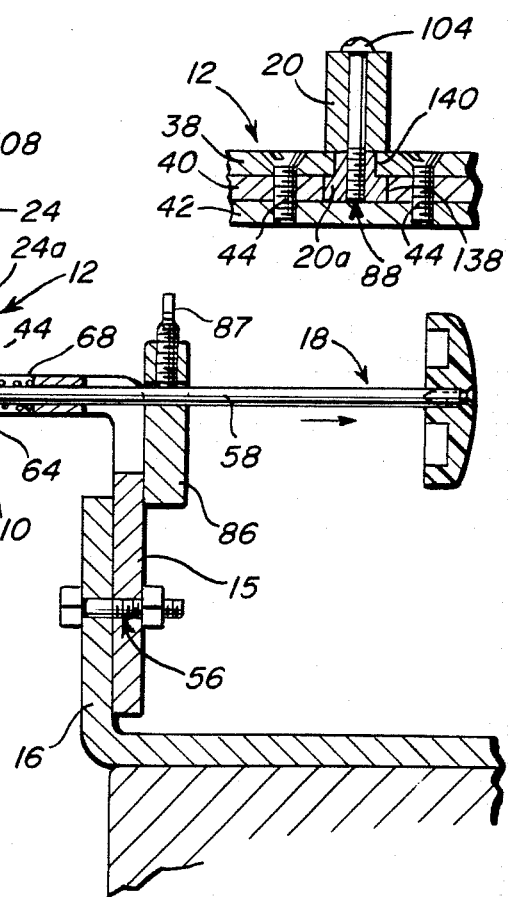
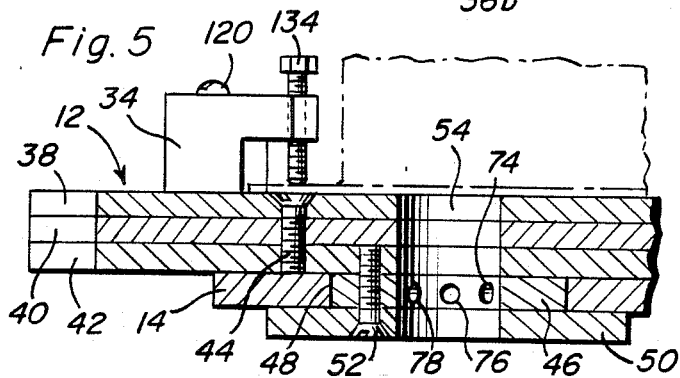
Fig. 5
Fig. 6

LAZY SUSAN VISE

BACKGROUND OF THE INVENTION

This invention relates to a rotary vise structure of versatile application, which can be used to advantage for holding an article while work is performed on the article, and which provides a facility for selectively rotating the article to different rotational positions while it is clamped in the vise. Among the diverse uses of a vise structure in accordance with the invention, for example, is its suitability for holding a small IC engine of the type commonly used on lawnmowers and the like, while servicing and/or testing the engine.

Description of the Prior Art

Acknowledgement is made of the following U.S. patents pertaining to rotary workholding devices:

| | |
|---|---|
| 1,376,077 | Sept. 26, 1921 |
| 2,079,323 | May 4, 1937 |
| 2,415,259 | Feb. 4, 1947 |
| 2,803,277 | Aug. 20, 1957 |
| 3,049,032 | Aug. 14, 1962 |
| 3,175,820 | Mar. 30, 1965 |
| 3,693,965 | Sept. 26, 1972 |

SUMMARY OF THE INVENTION

The invention provides a vise structure comprising a rotary worktable having clamping means associated therewith for releasably retaining an article thereon, and means for mounting the worktable on a workbench or the like for rotation of the table about a vertical or horizontal axis. In one preferred form of the invention, the worktable may be journalled in a base member adapted to be secured in required position on the workbench or the like, the base member having associated therewith a releasable latch device for retaining the worktable in selected rotational positions, and permitting rotation of the worktable when the latch device is released. The latch device may, for example, be adapted to register with angularly displaced receiving formations of the rotary table, enabling the table to be latched in preselected angular positions and, by release of the latch device, to be indexed between such positions. Further, the latch device may include a retaining mechanism for holding it in released position allowing free rotation of the worktable. The worktable and base member may be formed with a central axially extending bore enabling an IC engine of the type previously mentioned to be accommodated, with the engine flange clamped against the worktable and the engine shaft received in the bore.

In accordance with another feature of the invention, the clamping means for releasably retaining an article on the worktable comprises a plurality of clamping jaws mounted for longitudinal adjustment in profiled retention slideways formed in the worktable, the base of each jaw and its associated slideway being of complementary cross-sectional profile (e.g. each being in the form of an inverted T) and wherein the worktable is formed from a plurality of superimposed plates secured face to face with registering slots of suitable widths formed in the respective plates to define the profiles of the slideways. Fabricating the worktable from suitably slotted individual plates, rather than milling profiled slots in a solid plate, can result in economies and simplification in manufacture of the worktable.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE INVENTION

FIG. 3 is an underneath plan view of the structure, with the mounting assembly shown in cross section.

FIG. 4 is a cross-sectional view on line 4—4 of FIG. 2.

FIG. 5 is a cross-sectional view on line 5—5 of FIG. 2.

FIG. 6 is a cross-sectional view on line 6—6 of FIG. 2.

DESCRIPTION OF THE PREFERRED EMBODIMENT

Figure 1:
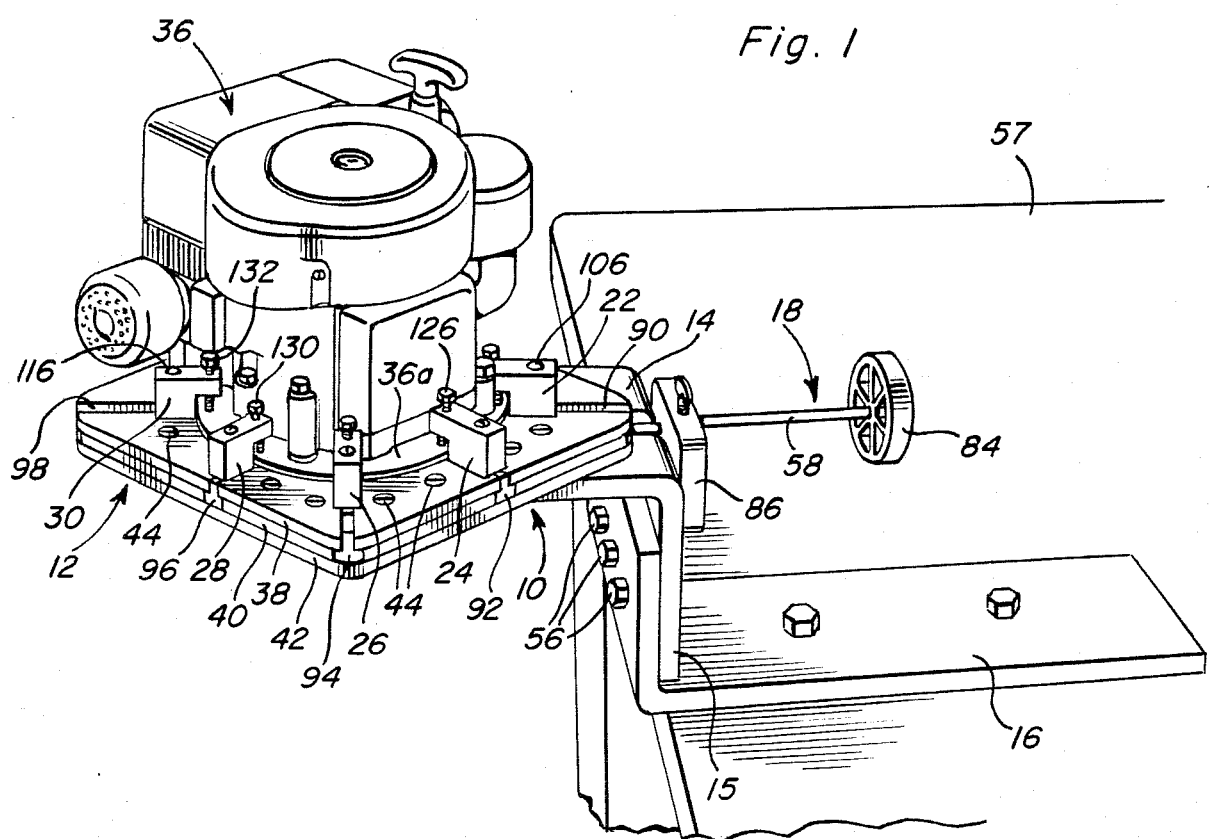
FIG. 1 is a perspective view of a rotary vise structure in accordance with the invention, with a lawnmower engine secured thereto.
Figure 2:
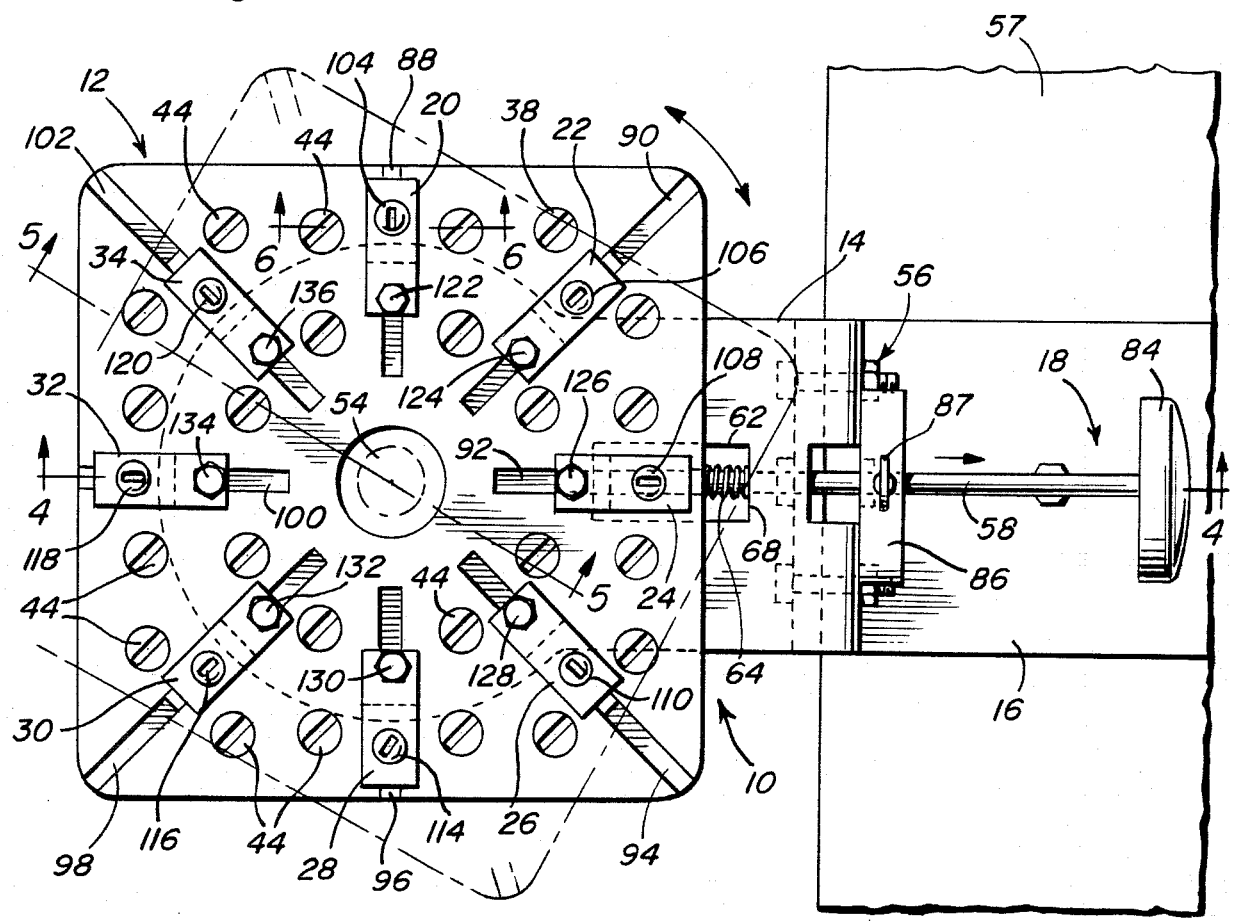
FIG. 2 is a plan view of the vise structure.

A vise structure generally indicated by reference 10 comprises a rotary worktable 12, a bracket 14 forming a base in which the worktable is journalled, a support bracket 16, a releasable latch device 18 for the worktable, and adjustable jaws 20, 22, 24, 26, 28, 30, 32, 34 for releasably securing an article such as a lawnmower engine 36 on the worktable.

As seen more particularly in FIGS. 4 to 6, worktable 12 is formed from three superimposed rectangular metal plates 38, 40, 42 secured together face to face by screws 44, a metal bearing ring 46 fitting in a circular opening 48 in bracket 14, and a securing plate 50 attached to ring 46 and plate 42 by screws 52 after assembling in bracket 14. The worktable may therefore be rotated in bracket 14 about a vertical axis. For larger structures, roller bearings may be provided between the worktable and the bracket. An axial bore 54 is provided through the worktable and bracket by aligned holes drilled through the respective plates. Bracket 14 may be attached by bolt and nut connections 56 to support bracket 16, which may itself be suitably secured to a workbench 57.

Latch device 18 comprises an elongated rod 58 received in a horizontal bore 60 drilled through bracket 14. A rectangular cutout 62 is provided in the bracket to receive a coil compression spring 64 surrounding rod 58 and acting between a pin 66 on the rod and an outer wall 68 of the cutout. The spring urges rod 58 inwardly toward the axis of the worktable. The inner end 70 of the rod is adapted to register in selected holes 72, 74, 76, 78, 80, 82 drilled diametrically through ring 46, when the turntable is suitably oriented with respect to the bracket, so as to latch the turntable in a selected angular setting. The worktable may be indexed between settings by withdrawing rod 58 outwardly against the action of spring 64, thereby unlatching the turntable by withdrawing the inner end of the rod from the respective hole in ring 46. A handle 84 is provided on the outer end of the rod for this purpose. Further, the rod may be releasably retained in the outer unlatched position by means of a collar 86 on the rod which may be tightened onto the rod against the outside of bracket 14 when the rod is withdrawn by means of a collar-retaining thumb screw 87. When the rod is held in withdrawn position by the collar, the worktable can be freely rotated.

The jaws 20-34 each have base portions 20a-34a of inverted-T section, which are retained in slideways 88-102 of complementary cross section formed in the worktable. The jaws may be adjusted radially along the respective slideways and secured in place by tightening screws 104-120 respectively. (Bolts may be used in place of screws.) Tightening bolts 122-136 associated with the respective jaws may be used to tighten down an article (such as engine flange 36a) against the upper face of the worktable.

In accordance with an important aspect of the invention, the inverted-T shaped slideways 88-102 in the worktable are defined by suitably dimensioned and aligned slots formed in plates 38 and 40. Thus, as shown particularly in FIG. 6, slideway 88 is formed by a wide slot 138 (e.g. about one-half inch wide) in plate 40 and a narrow slot 140 (e.g. about one-quarter inch wide) in plate 38. The remaining slideways are formed in like manner. (Instead of forming slots in integral plates such as plates 38 and 40, the slideways could alternatively be formed by suitably spacing adjacent edges of individual plate segments.) This form of worktable and slideway construction fabricated from superimposed-slotted plates, eliminates the need for having to mill T-shaped profile slideways in a worktable, which is a relatively complex and expensive operation.

As shown in FIGS. 1-4, the vise structure can be used to clamp the flange 36a of a lawnmower or like engine on the worktable with the engine shaft 36b extending in bore 54, so that during servicing or testing the engine can be indexed to selected angular settings to suit a workman, and facilitate working on the engine. Further, the worktable may include a suitably positioned opening or slot (not shown) adapted to register with the engine drain plug.

The lazy susan vise may be anchored in several ways different from that shown in FIG. 1. The support plate 16 may be separated from the depending flange 15 on base plate 14 with the flange 15 being placed and clamped rigidly between the jaws of a conventional bench vise (not shown). Also, the base plate may be positioned on the top surface of the workbench 57 with the flange 15 being secured to the side edge of the workbench 57. In this position, the rod 58 and handle 84 would extend outwardly from the side edge of the workbench 57 and the workbench would be provided with an aperture in alignment with bore 54 to receive the engine shaft 36b. Alternatively, the right angular base plate 14 can be replaced by a flat plate bolted to the workbench. Thus, the engine or other workpiece may be supported at optimum height so that the desired work can be efficiently performed by individuals of different heighth. Also, in the event the engine flange 36b has a rib or other projection on the lower surface thereof, a plastic ring (not shown) may be provided for positioning between the flange 36b and plate 38. The plastic ring may be on the order of ¾ inch in thickness and ½ inch in width to enable firm support for flange 36b even if it has peripheral or radial ribs or other projections so that the engine can be safely test run during the repair procedure.

While the structure has been illustrated as supporting an engine for indexing movements of the worktable about a vertical axis, an alternative mounting bracket or the like may be provided for supporting an article for movement about a horizontal axis. The structure is suitable for use where indexing movements of an article to selected angular positions is required, or where free rotation of the article is required, for example, in spray painting, by securement of latching rod 58 in unlatched position. It will accordingly be appreciated that the invention provides a versatile, multipurpose vise structure of convenient readily constructed design. Further, while the structure may be manufactured predominantly in metal, the design lends itself to having significant portions thereof molded in plastic.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vise structure comprising a worktable, clamping means associated with the worktable for releasably retaining an article thereon, a plate-like base member, a bearing ring mounting the worktable in a circular opening in the base member for rotary movement of the worktable, and a latch device for releasably retaining the worktable in selected rotational positions relative to the base member wherein the latch device comprises an elongate rod disposed radially with respect to the bearing ring in a bore in the base member, circumferentially displaced radially extending holes in the bearing ring, an inner end of the rod being insertable into a selected hole to retain the worktable in a selected angular position, biasing means urging the rod inwardly toward said holes, the biasing means comprising a biasing coil spring around a portion of the rod extending through a cutout in the base member, the spring acting between an abutment member fixed on the rod and an end wall of the cutout, and retaining means for holding the rod in an outer unlatched position overcoming the force of said biasing means and allowing the worktable to be freely rotated, the retaining means comprising a collar on an actuating portion of the rod extending outwardly from the base member, and a screw for tightening the collar onto the rod with the collar engaging an outer edge surface of the base member and retaining the rod in the outer unlatched position.

2. The invention of claim 1 wherein the worktable has an axially extending through-bore for receiving the shaft of an engine or the like clamped on the worktable.

3. The invention of claim 1 wherein the clamping means comprises clamping jaws adjustably mounted on the worktable.

4. The invention of claim 3 wherein the jaws have profiled base portions received in slideways of complementary profile in the worktable.

5. The invention of claim 4 wherein the worktable comprises superimposed metal plate structures secured together face to face with adjacent edges of plate segments of the respective plate structures defining the profiles of said slideways.

6. In a work table construction for a workpiece-holding device, the worktable including means defining profiled slideways for receiving clamping jaws and the like of complementary profile, the improvement wherein the worktable comprises superimposed preformed metal plate structures secured together face to face with adjacent edges of plate elements of the respective structures defining the profiles of said slideways, wherein the respective plate structures comprise integral plates having aligned slots defining adjacent edges of the respective plate elements, wherein the slideways are of inverted-T shape, wherein the worktable comprises a lower unslotted plate, a central plate having a slot defining the cross-bar of the T, and an upper plate having a narrower slot aligned with the slot in the central plate and forming the upright of the T, wherein the plate structures are secured together with screw fasteners, and wherein the slideways extend radially from an outer periphery of the worktable toward the center thereof.

7. The invention of claim 6 wherein the turntable has a central through bore and the slideways terminate short of the through bore.

* * * * *